United States Patent

Magnus et al.

[11] Patent Number: 5,803,689
[45] Date of Patent: Sep. 8, 1998

[54] DEVICE FOR INTERCONNECTION OF TWO OBJECTS

[75] Inventors: Heyn Halfdan Magnus; Torstein Kasin, both of Kongsberg, Norway

[73] Assignee: Kongsberg Offshore AS, Kongsberg, Norway

[21] Appl. No.: 809,773

[22] PCT Filed: Jul. 25, 1996

[86] PCT No.: PCT/NO96/00191

§ 371 Date: Apr. 25, 1997

§ 102(e) Date: Apr. 25, 1997

[87] PCT Pub. No.: WO97/05397

PCT Pub. Date: Feb. 13, 1997

[30] Foreign Application Priority Data

Jul. 27, 1995 [NO] Norway ..................................... 952986

[51] Int. Cl.⁶ .............................. F16B 19/00; A41F 1/00
[52] U.S. Cl. .......................... 411/355; 411/21; 411/348; 24/607
[58] Field of Search ..................................... 411/354, 355, 411/55, 21, 344, 348; 24/453, 607

[56] References Cited

U.S. PATENT DOCUMENTS

| 2,472,651 | 6/1949 | Diaper | 24/607 |
| 4,017,115 | 4/1977 | Holt | 411/21 |
| 4,549,846 | 10/1985 | Torii | 24/607 |
| 4,553,889 | 11/1985 | Le Dantec | 411/55 |
| 4,671,718 | 6/1987 | Eakin . | |
| 4,692,076 | 9/1987 | Herb . | |
| 4,929,135 | 5/1990 | Delarue | 411/354 |

FOREIGN PATENT DOCUMENTS

| 0 002 654 | 7/1979 | European Pat. Off. . |
| WO 84/03917 | 10/1984 | WIPO . |

Primary Examiner—Flemming Saether
Attorney, Agent, or Firm—Young & Thompson

[57] ABSTRACT

A device for fastening together two devices (1, 30), wherein the first device (1) comprises a screw (20) with a pointed end section (26), and at least one engagement element (50) which is arranged to abut against the end section (26) and radially movable between two end positions by means of the end section (26) and in relation thereto. The second device (30) comprises a shoulder section (36) with a central opening (39), through which the engagement element (50) can be inserted when it is located in its radially inner position. The shoulder section (36) is arranged to engage with a contact section (51) of the engagement element (50) when it has been passed through the opening (39) and is located in its radially outer end position. The screw (20) is mounted rotatably, but axially immovable in relation to the frame (2), and is screwed into a nut (15), which is mounted axially movably in the frame (2) and arranged to abut against the shoulder section (36). The engagement elements (50) mounted in the nut (15).

4 Claims, 3 Drawing Sheets

DEVICE FOR INTERCONNECTION OF TWO OBJECTS

FIELD OF THE INVENTION

The invention relates to a device for fastening together two devices, wherein the first device comprises a first frame which carries a body, which has a conical, pointed first end section, and at least one engagement element, which has a first contact section which is arranged to abut against the end section, the engagement element being movable in relation to the end section, considered in the direction of the end section's longitudinal axis, and by means of such a relative movement of the body and the engagement element and under the influence of the end section it can also be moved radially in relation to the end section between a first position, wherein the distance between the longitudinal axis and the engagement element is minimal, and a second position, wherein this distance is at a maximum, the second device comprises a second frame with an opening with a narrowed section which forms a shoulder section, through which the engagement element can be inserted when it is located in its first position, and which is arranged to engage with a second contact section of the engagement element when the latter has been passed through the opening and is located in its second position.

BACKGROUND OF THE INVENTION

In connection with oil and gas production a device of the above-mentioned type is known in the prior art for devices which have to be connected on the seabed. In this device the body is movable axially in the first frame and the engagement element is mounted radially movably in the frame. For movement of the body a linear hydraulic actuator is employed which is connected to the frame and to a pressure fluid source. The installation of the hydraulic actuator and the coupling thereof to the pressure source are cumbersome, time-consuming and complicated.

In the known device moreover during the connecting process the devices can be forcibly moved some distance towards each other. This distance corresponds to only possible axial extension of inclined planes of the second engagement section. In order that the axial force which is thereby created and the distance should be substantial, however, the engagement element's radial extension must be large. The device is therefore also space-consuming.

Furthermore the engagement element is secured in its second position merely by means of the friction between the end section and the first contact section.

SUMMARY OF THE INVENTION

The object of the invention is to provide a device of the above-mentioned type which is not encumbered by the above-mentioned disadvantages.

The characteristics of the device according to the invention are presented by the following characteristic features.

BRIEF DESCRIPTION OF THE DRAWINGS

The invention will now be described in more detail with reference to the drawing which schematically illustrates a device according to the invention.

DETAILED DESCRIPTION OF THE INVENTION

Figure 1:
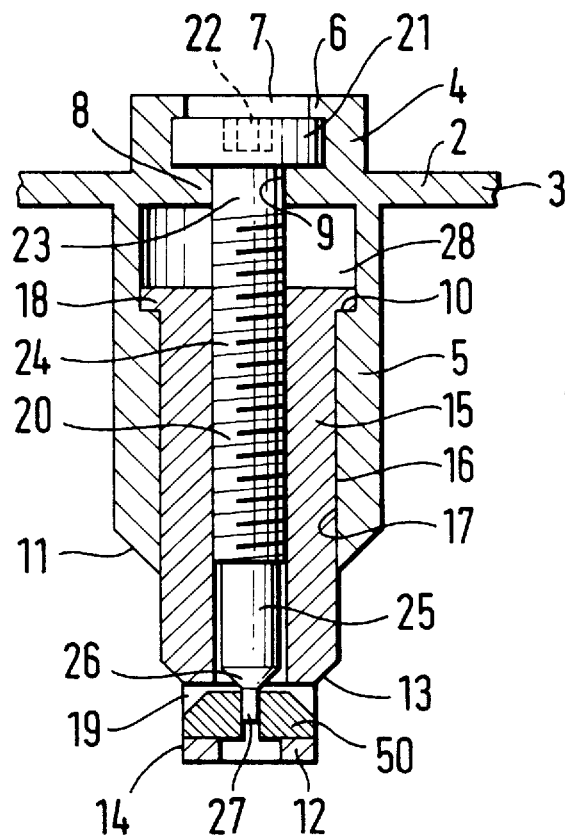
FIG. 1 shows a longitudinal section through a first device with components of the device according to the invention, sections of the device being cut away.

In the following the term "upwards" should be understood to be an indication of direction with reference to the figures and more specifically the direction from the edge of the drawings which face the reader and towards the opposite edge.

As illustrated in FIGS. 1–4 a first device 1 comprises a first frame 2 with a flange section 3. Upwards from this flange section 3 there extends a first, circular cylindrical sleeve-shaped section or screw head sleeve 4, and downwards from the flange section 3 there extends a second circular cylindrical sleeve section or guide sleeve 5.

The screw head sleeve 4 is terminated by a radially inwardly projecting ring flange section 6 which defines a first opening 7. In the common bottom 8 of the sleeves 4,5 there is provided a bearing bore 9 which is coaxial with the first opening 7.

At some distance from the bottom 8 the guide sleeve 5 has an upwardly facing shoulder 10 and its lower end 11 can be pointed conically downwards and radially inwards. Above the shoulder 10 the guide sleeve 5 has an extended section or space 28.

In the guide sleeve 5 there is provided a tubular, substantially cylindrical, tubular, internally threaded piece or nut 15 with an upper section with an outer cylinder surface 16 which is arranged to be able to slide axially on an inner cylinder surface 17 of the guide sleeve 5. In these cylinder surfaces there can be provided co-operating axial grooves or teeth (not shown), thus preventing the nut 15 from rotating in the guide sleeve 5.

On the upper part of the nut 15 there is a radially outwardly extending ring flange 18, which is arranged to be able to abut against the shoulder 10 of the guide sleeve 5, and which with clearance is arranged for axial movement in the space 28.

On the lower part of the nut 15 there is a lower, cylindrical section 12 with a lower, outer cylinder surface 14 with a diameter which is reduced in relation to the diameter of the upper, outer cylinder surface 16. The lower cylinder surface 14 is connected with the upper cylinder surface 16 via a contact section 13 in the form of a downwardly pointed, truncated cone.

In the lower cylindrical section 12 of the nut 15 there are provided three radial openings 19 which are adapted to the cross section of respective engagement elements 50. These will be described in more detail below. Furthermore the nut 15 has a central, axially extending hole whose central section is provided with threads.

In the centre of the nut 15 there extends a screw 20. On the upper part of the screw 20 there is a cylindrical head 21 which is provided with clearance in the screw head sleeve 4, thus enabling it to rotate, but not to be moved axially. The screw head 21 is provided with a coupling section which can be connected to a tool for rotation of the screw 20 in relation to the frame 2. The coupling section can be composed of an upwardly open, hexagonal hole 22, into which can be inserted an external hexagonal, pin-shaped tool (not shown).

Immediately below the head 21 the screw 20 has a cylindrical bearing section 23 which is rotatably mounted in the bearing bore 9.

Below the bearing section 23 the screw 20 has a section 24 with external threads which are screwed into the nut 15, and below the threaded section 24 the screw 20 has a cylindrical blocking section 25. The lower part of the screw is terminated by a downwardly pointed, conical end section 26 and a cylindrical guide pin 27.

Figure 2:
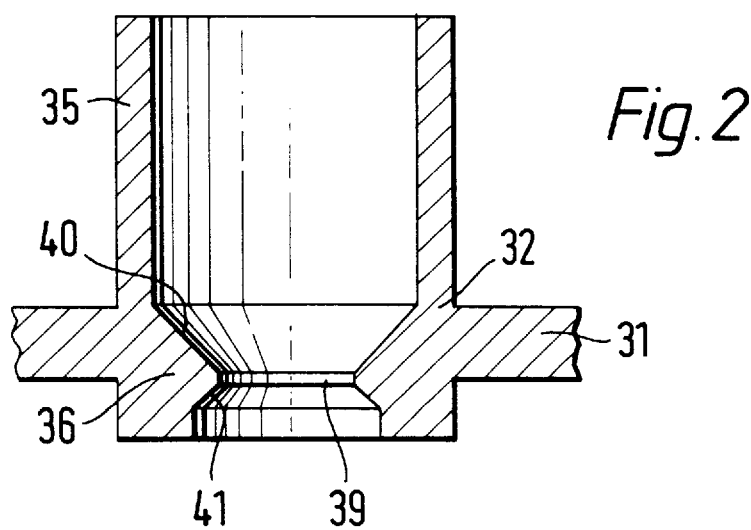
FIG. 2 shows a longitudinal section through a second device with sections according to the invention, sections of the device being cut away.

As illustrated in FIG. 2, the second device 30 comprises a second frame 32 with a flange section 31 from which there extends upwardly an upwardly open, third sleeve-shaped section or receiving sleeve 35 which is arranged to slidingly receive the guide sleeve 5 of the first device 1. The bottom of the receiving sleeve 35 is in the form of a radially inwardly extending, annular shoulder 36 which defines a central connection opening 39, and whose upper and lower surfaces 40 and 41 respectively are downwardly and upwardly pointed respectively, these surfaces being in the shape of truncated cones.

Figure 5:
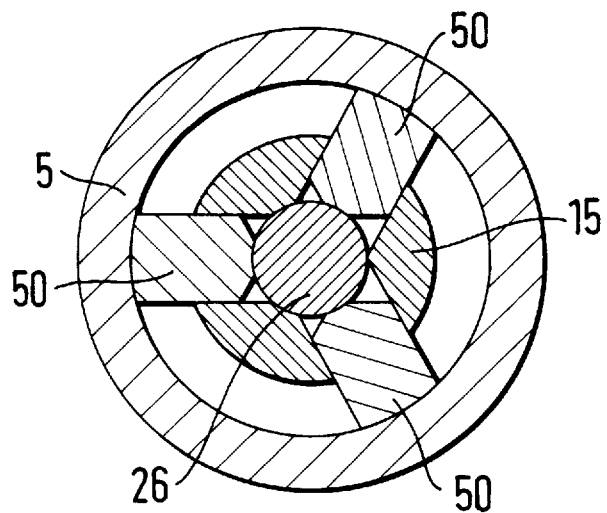
FIG. 5 shows a section along line V—V through the devices which are illustrated in FIG. 4, on an enlarged scale, where three engagement devices are held in a radially outer position.
Figure 6:
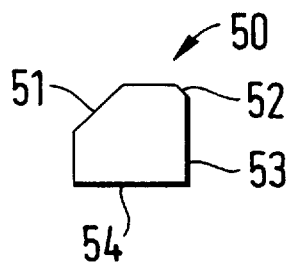
FIG. 6 is a side view of one of the engagement devices which are illustrated in FIG. 5.

As shown in FIG. 5 the first device 1 comprises three engagement elements 50 which are provided with an angular spacing of 120° around the screw's longitudinal axis, and in a plane which extends perpendicularly on this axis As is also illustrated in FIG. 6 each of the engagement elements 50 comprises a radially inner, obliquely extending surface or first contact section 52 which is adapted to the angle of slope of the lateral surface of the conical end section 26 of the screw 20. Moreover each engagement element 50 has a radially outer, obliquely extending surface or second contact section 51, whose angle of slope is adapted to the angle of slope of the lower surface 41 of the shoulder 36.

The lower part of the radially inner inclined plane 52 passes on the side which faces the screw's longitudinal axis into an inner surface section 53 which extends parallel thereto. Furthermore the engagement elements have a lower surface section 54 which extends perpendicularly to this screw's longitudinal axis, and whereby they can abut against and slide in a radial direction on that section of the nut 15 whose lower part defines the opening 19.

The function of the device is as follows, assuming that the devices 1,30 are separated to begin with as illustrated in FIGS. 1 and 2. The nut 15 is screwed downwardly in relation to the screw 20, thus causing the nut's ring flange 18 to abut against the shoulder 10 of the control sleeve 5. In this relative position of the screw 20 and the nut 15 the screw's guide pin 27 is located radially inside and between the engagement elements 50, and its conical end section 26 is located above these. The engagement elements 50 can now be located in a first position in which they are moved so far radially inwards that their radially inner surface section 53 touches the guide pin 27 and their distance from the screw axis is minimal.

Figure 3:
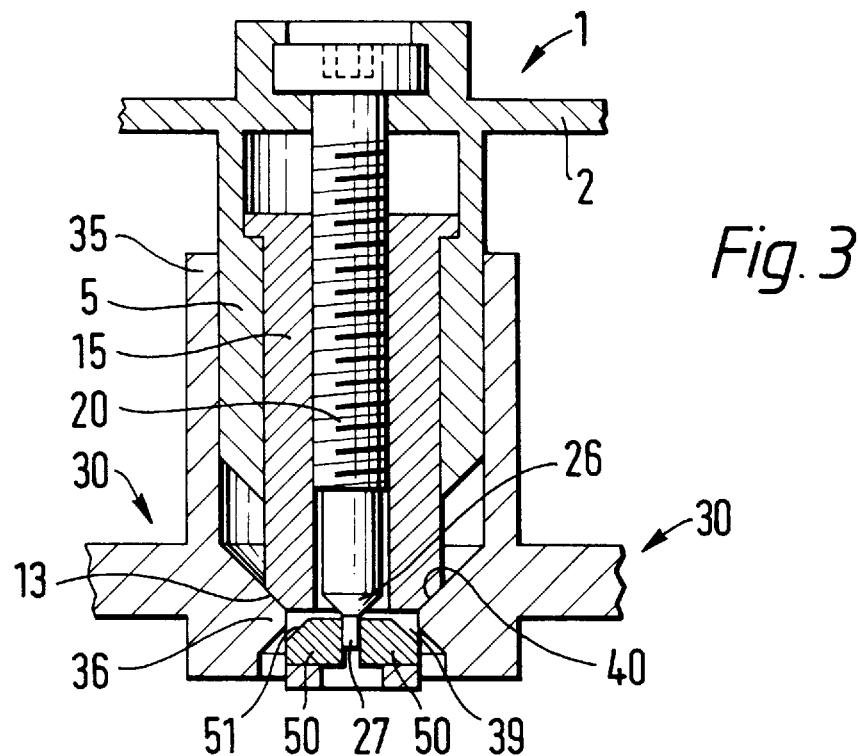
FIG. 3 shows a longitudinal section through the devices which are illustrated in FIGS. 1 and 2, where the devices are placed together and partially connected to each other, and sections of the devices are cut away.

In order to connect the devices 1,30 to each other they are positioned in such a manner that the guide sleeve 5 of the first device 1 and the receiving sleeve 35 of the second device 30 extend coaxially to each other, whereupon the guide sleeve 5 is introduced into the receiving sleeve 35 until the nut's contact section 13 abuts against the upper surface 40 of the second device's shoulder 36. If the engagement elements 50 are not located in the first position to begin with, they will abut against the upper surface 40, thus causing them to be moved into the first position. At the same time it can be arranged that any guide pins (not shown) of one of the devices are inserted into associated holes (not shown) of the second of the devices, thus ensuring that rotation of the devices 1,30 in relation to each other is not possible and ensuring that the guide sleeve 5 is passed into the receiving sleeve 35. Thus the relative position of the devices corresponds to that which is illustrated in FIG. 3.

A suitable tool is then brought into engagement with the internal hexagon of the screw head 21 and the screw 20 rotated in such a direction that the screw 20 is moved downwardly in relation to the nut 15 while the contact between the contact section 13 and the upper surface 40 is maintained. If no grooves and teeth are provided in the guide sleeve 5 or the nut 15, other measures can be taken, e.g. the friction between the contact section 13 and the upper surface 40 can be so great that the guide sleeve 5 and the nut 15 do not rotate in relation to each other.

As the screw 20 is thus screwed down its end section 26 comes into abutment against the radially inner inclined plane 52 of the engagement elements 50, thus causing them to be forced radially outwards until the screw's blocking section 25 is located between the engagement elements and the radial movement thereof ceases, and the radially outer inclined plane 51 is then located near the lower surface 41 of the second device's shoulder 36.

Figure 4:
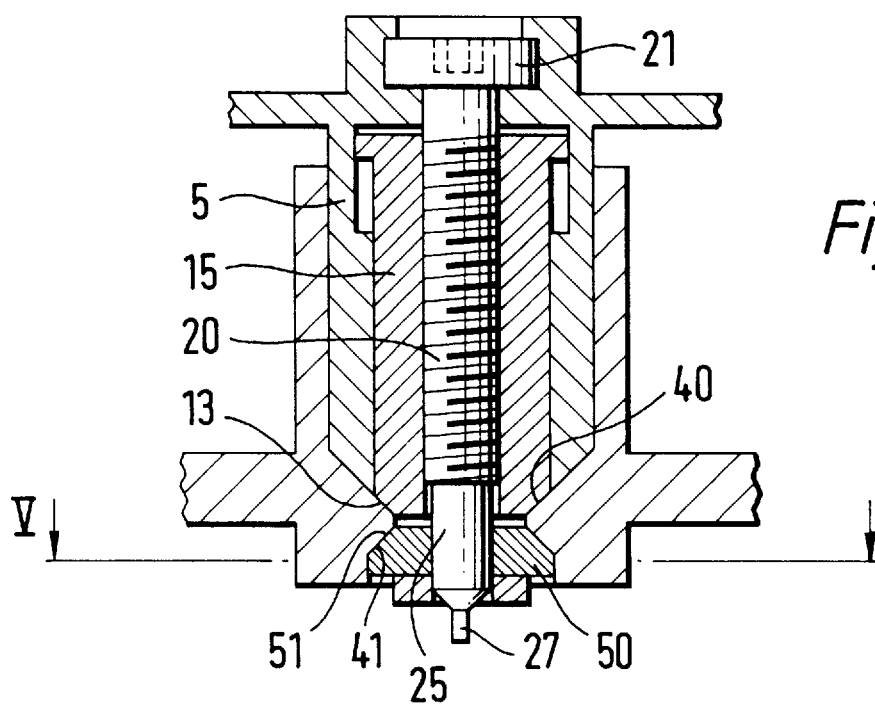
FIG. 4 shows a longitudinal section which resembles that which is illustrated in FIG. 3, but where the devices are fully connected.

As the screw 20 continues to be screwed downwards and if a force is exerted on the devices which attempts to prevent them from being moved towards each other, the radially outer surface 51 of the engagement elements 50 comes into forceful abutment against the lower surface 41, and the screw head 21 comes into forceful abutment against the bottom 8. The devices 1,30 are thereby forced against each other until contact surfaces (not shown) of, e.g., the devices' frames abut with each other and the devices cannot be moved closer to each other, This relative position is illustrated in FIG. 4.

In order to loosen the connection between the devices 1,30, the screw 20 is screwed the other way. If forces are exerted by, e.g., the guide pins (not shown), which forces attempt to prevent the devices from being moved away from each other and to maintain the relative position of the devices which is illustrated in FIG. 4, the upper surface of the screw head 21 comes into forceful abutment against the ring flange 6, and the contact section 13 comes into forceful abutment against the shoulder 36, thus pressing the devices away from each other with great force.

When the screw 20 has been screwed out to such an extent that the guide pin 27 is again located between the engagement sections 50 and any guide pins have been pulled out of their holes, the engagement sections 50 can be freely moved radially inwards and the guide sleeve 5 can be pulled out of the receiving sleeve 35. For example, the cooperating, sloping surfaces 41,51 can cause the engagement elements 50 to be pushed in in this manner during pulling of the first device 1 upwards from the second device 30.

The powerful drawing together of the devices after they have been connected by means of the engagement elements and the force pushing apart of the devices during uncoupling ensure a simple connection or release of, e.g. rapid pipe couplings, guide pins, etc., which may be provided on the devices.

It should be noted that flanges, screws, etc. which may be necessary for the practical implementation and assembly of the described components of the device, but which do not concern its principal design, have been omitted in the drawing, since the provision of such flanges, etc. will be obvious to a person skilled in the art. For example, it should be mentioned that the two sleeve sections 4,5 of the first device can be connected with its flange section via flanges and screws, or be screwed on to this flange section in order to permit mounting of the screw 20 and the nut 15.

The screw 20 may preferably be arranged to be rotated by means of a remotely operated vessel or ROV.

Figure 7:
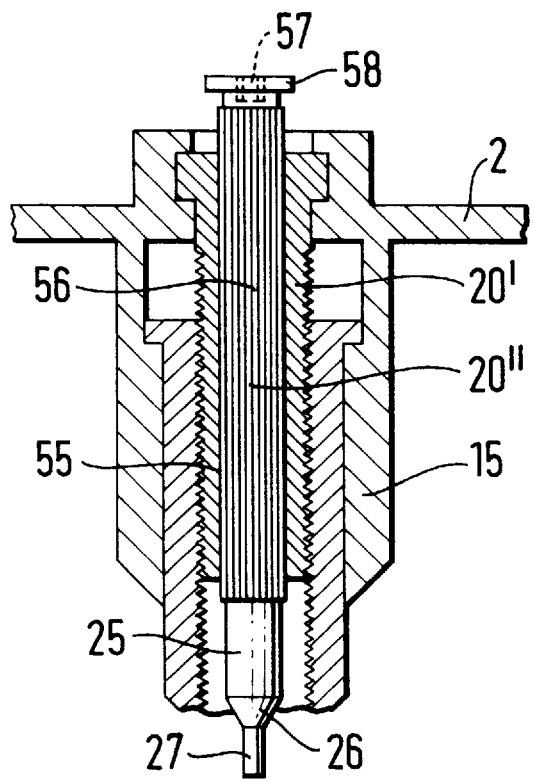
FIG. 7 shows a section which resembles the section according to FIG. 1, but where a different embodiment of a central screw is illustrated.

FIG. 7 illustrates an alternative embodiment of a screw corresponding to the screw 20. Components in this embodiment which correspond to components in the above-described embodiment are given the same reference numerals in FIG. 7.

In this embodiment of the screw it comprises a radially outer sleeve 20' which has external threads corresponding to the threads 24, and which are engaged with the nut 15. Internally the sleeve has axially extending splines or teeth 55 which are engaged with complementarily formed splines or teeth 56 of a radially inner stem 20".

The lower end section of the stem 20" is of a similar design to the lower end section of the screw 20, with a blocking section 25, an end section 26 and a guide pin 27. The stem 20" may have force fit in relation to the sleeve 20', thus causing the stem 20" to accompany the sleeve 20' when it is screwed and axially displaced in relation to the nut 15, or there may be provided a radially extending shear pin or the like (not shown), which is inserted into aligned holes in the stem 20" and the sleeve 20'.

The external sleeve 20' and the stem 20" are thus axially movable in relation to each other when overcoming the force fit or shag of the shear pin, but rotationally firmly connected. On the top part of the stem 20" there is an internal hexagonal hole 57 whereby the stem can be rotated by means of a suitable tool, and a flange 58. On the upper part of the outer sleeve 20' there is a head 21 which prevents axial movement of the sleeve 20' in relation to a frame 2.

When the stem 20" is rotated by means of a tool, the sleeve 20' is also rotated, thus causing axial movement of the nut 15 in the above-described manner and interconnection of the devices 1,30. Rotation of the stem 20" the opposite way causes the devices 1,30 to be released from each other.

If it is desirable, e.g. in an emergency, to release the devices 1,30 rapidly, a tool can be brought into engagement with the flange 58 and the stem 20" is forcefully pulled axially away from the sleeve 20', overcoming the frictional force which is created by the force fit or shearing of the shear pin, with the result that the lower end section of the stem 20" no longer blocks the engagement elements 50.

We claim:

1. A device for fastening together two parts, comprising:
   a first part which comprises:
      a first frame carrying a screw which has a conical, pointed first end section having a longitudinal axis, said screw being rotatable, but axially immovable in relation to the first frame;
      an internally threaded piece mounted axially movable but rotatably immovable in the first frame for receiving said screw;
      at least one engagement element mounted in the internally threaded piece, and having a first contact section arranged to abut against the end section, the engagement element being movable relative to the end section in the direction of the end section's longitudinal axis, the engagement element being also movable radially in relation to the end section between a first position, wherein the distance between the longitudinal axis and the engagement element's radially outer end is minimal, and a second position, wherein said distance is at a maximum;
   a second part which comprises:
      a second frame having an opening with a narrowed section which forms a shoulder section, and through which the engagement element can be inserted when located in the first position, and said narrowed section being arranged to engage with a second contact section of the engagement element when the engagement element has passed through the opening and is located in the second position;
      said screw comprising an externally threaded sleeve surrounding a stem part which is rotationally fixed in relation to the sleeve and which comprises the first end section, said stem part being axially movable relative to the sleeve; and retaining means for preventing an unintentional relative axial movement.

2. Device according to claim 1, wherein the retaining means comprise a force fit of the stem relative to the sleeve.

3. Device according to claim 1, wherein the retaining means comprise a shear pin which is inserted into aligned holes in the stem and the sleeve.

4. A device for fastening together two parts, comprising:
   a first part which comprises:
      a first frame carrying a screw which has a conical, pointed first end section having a longitudinal axis, said screw being rotatable, but axially immovable in relation to the first frame;
      an internally threaded piece mounted axially movable but rotatably immovable in the first frame for receiving said screw;
      at least one engagement element mounted in the internally threaded piece, and having a first contact section arranged to abut against the end section, the engagement element being movable relative to the end section in the direction of the end section's longitudinal axis, the engagement element being also movable radially in relation to the end section between a first position, wherein the distance between the longitudinal axis and the engagement element's radially outer end is minimal, and a second position, wherein said distance is at a maximum;
   a second part which comprises:
      a second frame having an opening with a narrowed section which forms a shoulder section, and through which the engagement element can be inserted when located in the first position, and said narrowed section being arranged to engage with a second contact section of the engagement element when the engagement element has passed through the opening and is located in the second position;
      said internally threaded piece and said second frame having respective axially facing contact surfaces which contact each other when the engagement element has been inserted through the opening.

* * * * *